United States Patent
Madsen

(10) Patent No.: US 10,916,017 B2
(45) Date of Patent: Feb. 9, 2021

(54) METHOD AND APPARATUS FOR DETECTING MOTION DEVIATION IN A VIDEO SEQUENCE

(71) Applicant: CANON KABUSHIKI KAISHA, Tokyo (JP)

(72) Inventor: John Madsen, Regstrup (DK)

(73) Assignee: Canon Kabushiki Kaisha, Tokyo (JP)

(*) Notice: Subject to any disclaimer, the term of this patent is extended or adjusted under 35 U.S.C. 154(b) by 132 days.

(21) Appl. No.: 16/209,129

(22) Filed: Dec. 4, 2018

(65) Prior Publication Data
US 2019/0188861 A1    Jun. 20, 2019

(30) Foreign Application Priority Data

Dec. 19, 2017 (GB) .................................. 1721333.1

(51) Int. Cl.
*G06T 7/20* (2017.01)
*G06K 9/00* (2006.01)
*G06T 7/254* (2017.01)

(52) U.S. Cl.
CPC .................. *G06T 7/20* (2013.01); *G06K 9/00* (2013.01); *G06T 7/254* (2017.01);
(Continued)

(58) Field of Classification Search
CPC . G06T 7/20; G06T 7/254; G06T 2207/20021; G06T 2207/20081;
(Continued)

(56) References Cited

U.S. PATENT DOCUMENTS 7,133,537 B1 * 11/2006 Reid ........................ G06T 7/254
 382/103
7,236,527 B2 * 6/2007 Ohira ...................... H04N 5/145
 348/E5.066

(Continued)

FOREIGN PATENT DOCUMENTS

EP      1631073 A2      3/2006
GB      2283385 A       5/1995
WO      2000/073996 A1  12/2000

OTHER PUBLICATIONS

Combined Search and Examination Report under Sections 17 and 18(3) for Application No. GB 17213331, dated Jun. 19, 2018.

*Primary Examiner* — Nizar N Sivji
(74) *Attorney, Agent, or Firm* — Canon U.S.A., Inc. IP Division

(57) ABSTRACT

Detection of motion deviation in a video sequence is provided. Change grids each comprise elements generated by storing in each element of the change grid an indication of whether there is change between corresponding elements of at least two images. A current direction grid is generated from a pair of change grids by searching for movement of a corresponding segment identified in each change grid, the movement occurring between the locations of the segment in each of the pair of change grids and, storing in elements of the current direction grid a vector corresponding to the movement of the segment. A vector stored in an element of the current direction grid is compared with a reference vector. It is determined whether there is motion deviation in the video sequence in accordance with the comparison.

23 Claims, 17 Drawing Sheets

(52) U.S. Cl.
CPC ............... *G06T 2207/10016* (2013.01); *G06T 2207/20021* (2013.01); *G06T 2207/20081* (2013.01); *G06T 2207/30232* (2013.01); *G06T 2207/30236* (2013.01)

(58) Field of Classification Search
CPC . G06T 2207/30236; G06T 2207/10016; G06T 2207/30232; G06T 7/251; G06K 9/00; G06K 9/00771; H04N 7/18; H04N 5/144
See application file for complete search history.

(56) References Cited

U.S. PATENT DOCUMENTS

| | | | |
|---|---|---|---|
| 8,320,458 B2* | 11/2012 | Sato | G06T 3/4007 375/240.12 |
| 8,508,599 B2* | 8/2013 | Miyasako | G06K 9/00261 348/208.1 |
| 9,641,838 B2* | 5/2017 | Takeda | H04N 19/463 |
| 10,425,582 B2* | 9/2019 | Kopf | G06T 5/50 |
| 2003/0219146 A1 | 11/2003 | Jepson et al. | |
| 2006/0045185 A1* | 3/2006 | Kiryati | G08B 13/19608 375/240.16 |
| 2008/0201116 A1* | 8/2008 | Ozdemir | G08B 21/0423 703/2 |
| 2011/0205359 A1* | 8/2011 | Lee | G06T 7/285 348/143 |
| 2012/0170802 A1* | 7/2012 | Millar | G06K 9/00785 382/103 |
| 2012/0229630 A1 | 9/2012 | Huang | |
| 2014/0072180 A1* | 3/2014 | Yamaguchi | G06T 7/254 382/107 |
| 2014/0254933 A1* | 9/2014 | Jin | G06T 7/238 382/173 |
| 2015/0222919 A1 | 8/2015 | Licata | |
| 2015/0281715 A1 | 10/2015 | Lawrence et al. | |
| 2016/0005281 A1 | 1/2016 | Laska et al. | |
| 2018/0227538 A1* | 8/2018 | Wang | G06K 9/00771 |

* cited by examiner

140

| 141 | 1 | 1 | 0 | 0 | 0 | 0 | 0 | 0 |
|---|---|---|---|---|---|---|---|---|
| | 1 | 0 | 0 | 0 | 0 | 0 | 0 | 0 |
| | 0 | 0 | 0 | 1 | 1 | 1 | 0 | 0 | 142
| | 0 | 0 | 0 | 1 | 1 | 1 | 0 | 0 |
| y | 0 | 0 | 0 | 0 | 0 | 0 | 0 | 0 |
| | 0 | 0 | 0 | 0 | 1 | 1 | 0 | 0 |
| | 0 | 0 | 0 | 0 | 1 | 1 | 1 | 0 |
| | 0 | 0 | 0 | 0 | 0 | 1 | 1 | 0 | x

FIG. 1B

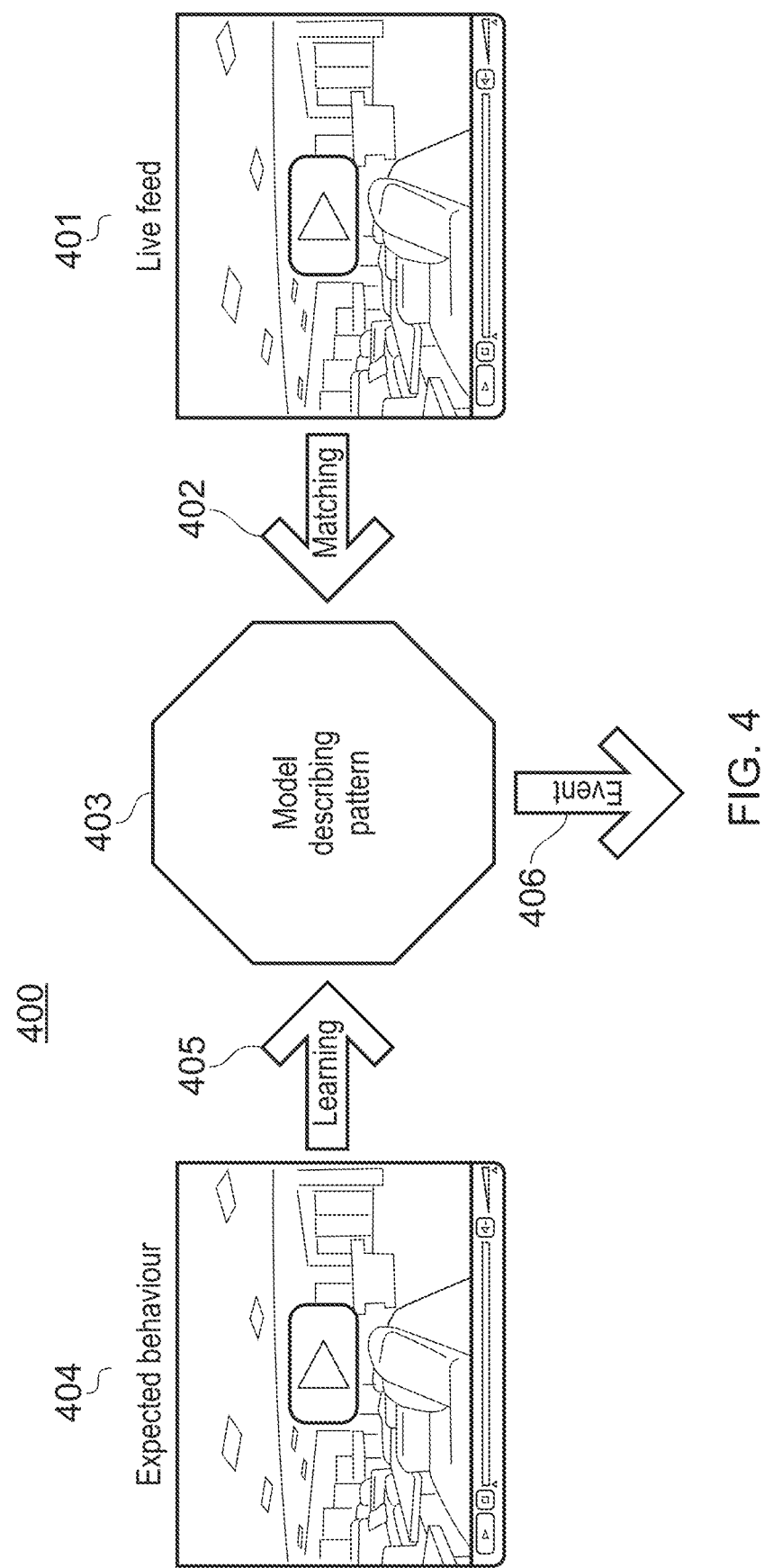

METHOD AND APPARATUS FOR DETECTING MOTION DEVIATION IN A VIDEO SEQUENCE

CROSS-REFERENCE TO RELATED APPLICATION

The present patent application claims the benefit under 35 U.S.C. § 119(a)-(d) of United Kingdom Patent Application No. GB1721333.1, filed on Dec. 19, 2017 and entitled "METHOD AND APPARATUS FOR DETECTING MOTION DEVIATION IN A VIDEO SEQUENCE". The content of GB1721333.1 is incorporated herein by reference in its entirety.

TECHNICAL FIELD

The present invention relates to detecting motion deviation in a video sequence, such as the detection of direction deviation. More particularly, and without limitation, the present invention relates to a method, an apparatus and a computer program for detecting motion deviation in a scene of a surveillance video using a grid based model.

BACKGROUND

In video surveillance and monitoring technologies, the detection of deviation is commonly used for determining when to record a video. The motion of an object is typically detected by motion detecting sensors such as passive infrared (PIR) sensors, sensors which use microwave or ultrasonic pulses, or vibration sensors. In imaging technology, algorithms are known for detecting motion in a continuous video stream. Some algorithms are based on comparing the current video frame to one from the previous frames. Some motion detection methods utilize image processing filters to find regions in which two video frames differ from each other.

However, most of the conventional image processing algorithms are computationally heavy and thus not applicable to big video surveillance setups because the hardware costs would be too high. Also, with the above conventional methods, it is not possible to distinguish between normal and abnormal motion. Consequently, it is not possible to detect the change in the direction of motion.

Thus, there is a need for detecting deviation in a surveillance video, which provides optimized usage of computing and hardware resources. In particular, an example of the general concept of deviation detection is the detection of direction deviation.

SUMMARY OF THE INVENTION

The present invention provides a method, apparatus and non-transitory computer readable medium for detecting deviation in a scene of a surveillance video using a grid based model.

Aspects of the present disclosure are defined by the independent claims.

Grid data has a very small size so that it requires much less storage space compared to video data. The grid data can be stored as metadata separately in a database or together with the video data without requiring any significant extra disk space. Hence, the present disclosure optimizes the usage of computing and memory resources and thus reduces hardware costs.

Traffic load due to transfer of grid data, for example when retrieving recordings located at remote sites, will remain small. Due to the small amount of data to be transferred, it does not occupy or require high network capacity. This is especially preferable since the available bandwidth between surveillance cameras and servers processing the data may often be limited and its use may be prioritised for other purposes during business hours.

The model may be generated from a live video sequence or a previously recorded video sequence. This is advantageous when there is not enough network capacity to transfer complete video recordings in a timely fashion. The deviation detection can be performed using the previously stored metadata, thus allowing for very fast forensic deviation detection. All computing operations may be performed on grid data alone so they are computationally light weight.

Furthermore, the present disclosure provides for the extracting and comparing of motion patterns using only grid metadata. Thus, the amount of data to be analysed remains low in comparison to using conventional image processing algorithms. This reduces the required computing resources in systems implementing the present disclosure.

Each of the embodiments of the present invention described below can be implemented solely or as a combination of a plurality of the embodiments or features thereof where necessary or where the combination of elements or features from individual embodiments in a single embodiment is beneficial.

BRIEF DESCRIPTION OF THE DRAWINGS

Embodiments will now be described, by way of example only, with reference to the accompanying drawings, in which:

FIG. 1B is a diagram illustrating a change grid;

FIG. 4 is a diagram illustrating a method of updating the direction model;

DETAILED DESCRIPTION

Various illustrative embodiments of the invention will be described in detail below with reference to the drawings. Configurations according to the illustrative embodiments of the present invention, which will be described below, are merely examples, and the present invention is not limited to these configurations.

Figure 1A:
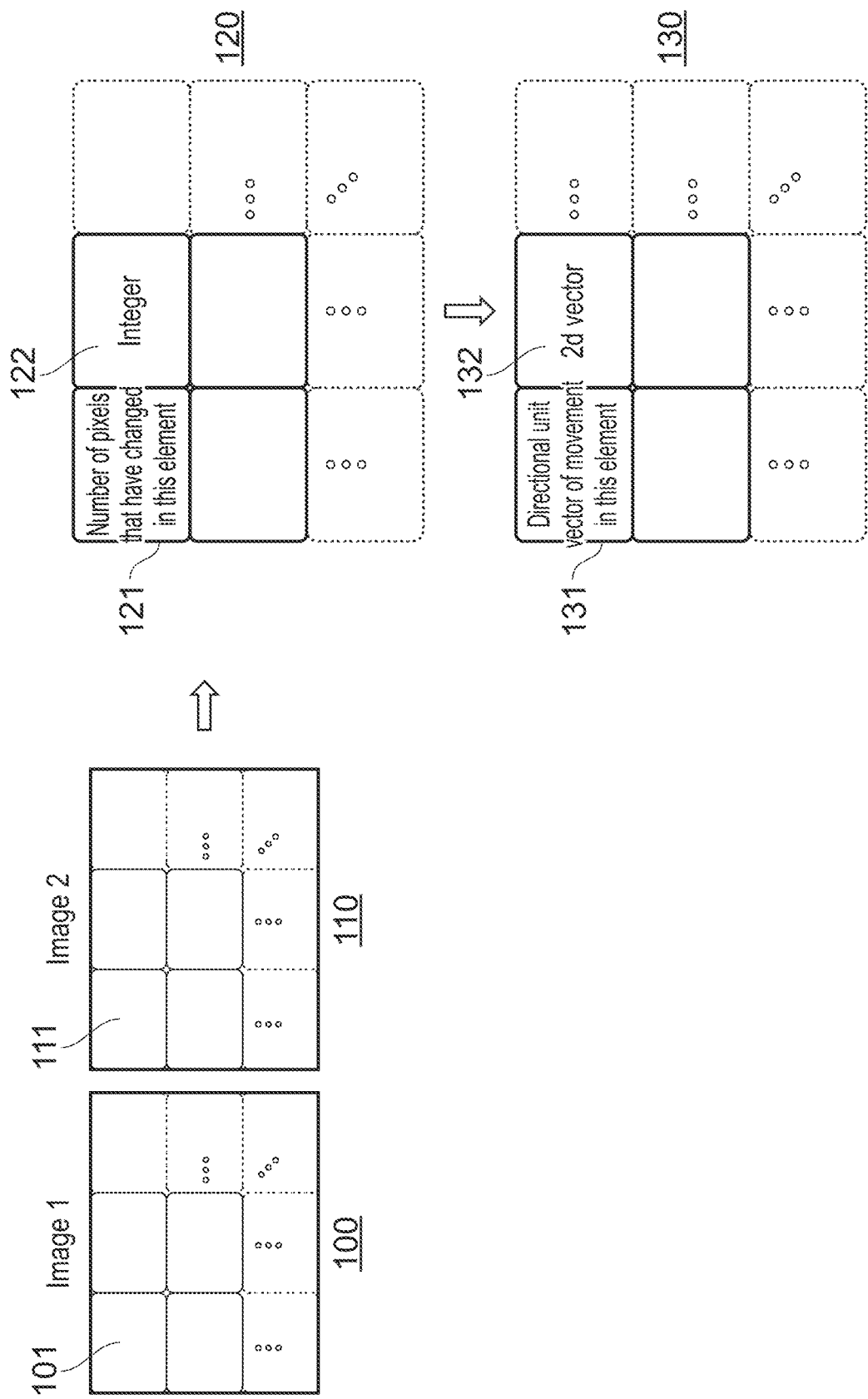
FIG. 1A is a diagram illustrating a method of generating a direction grid.

FIG. 1A illustrates a method of generating a direction grid. In FIG. 1A, at least two images or video frames, Image 1 (100) and Image 2 (110), are captured from a video sequence (not shown). The video sequence may be a live video sequence so that change grid 120 and direction grid 130 may be generated in real time. The video sequence may also have been recorded in advance and stored in a memory. The video sequence may comprise a certain, selected video scene of a surveillance video. The video may be recorded by a surveillance camera.

First, each of the at least two captured images 100, 110 is divided into a grid of a plurality of elements 101, 111 so that for each element of the grid of Image 1, there is a corresponding element on the grid of Image 2, having the same location and size. Each element of the grid includes a plurality of pixels. For example, the grid may be made up of 64 elements arranged in a 8×8 square, with each element comprising 64×64 pixels. However, it is not necessary for a grid or the elements to be square in shape, as alternatively they could be rectangular in shape.

Throughout this description, the term 'corresponding elements' refers to elements having the same location and size on different grids. The location may be defined for example by a row and a column on the grid.

Since the at least two images 100, 110 are captured at different temporal locations of the video, the image may be the same or it may have changed, if there is an object moving in the video which is captured into the image. The change can be detected by comparing the corresponding elements 101, 111 in the two images 100, 110, respectively, with each other. The change may be measured for example by counting the number of changed pixels in the corresponding elements. However, also other measurement methods may be used. This forms a simple motion detection algorithm that is light in processing power requirements.

In the following, it is described how the change grid 120 and the direction grid 130 are generated. First, it is determined how many pixels have changed 121 between the two captured images 100, 110 in each grid element. This information is stored as an integer 122 in each element of the change grid 120. In the present embodiment a value of 1 is assigned if there is motion detected and a value of 0 is assigned if there is no motion. Alternatively, the change between the images may also be measured by other features, because a variety of techniques are available for the detection of motion between video frames, such as the use of more than two frames.

The previously described binarization may be based on the determined number of changed pixels in an element, whether there is a change in the element. A change would be an indication that there is motion in the video in that element. The determination may take into account a threshold value so that not all changes in the video are registered as motion. For example, it may be assumed that there is a certain amount of noise present in the image, which may be taken into account by providing a noise threshold.

Figure 1C:
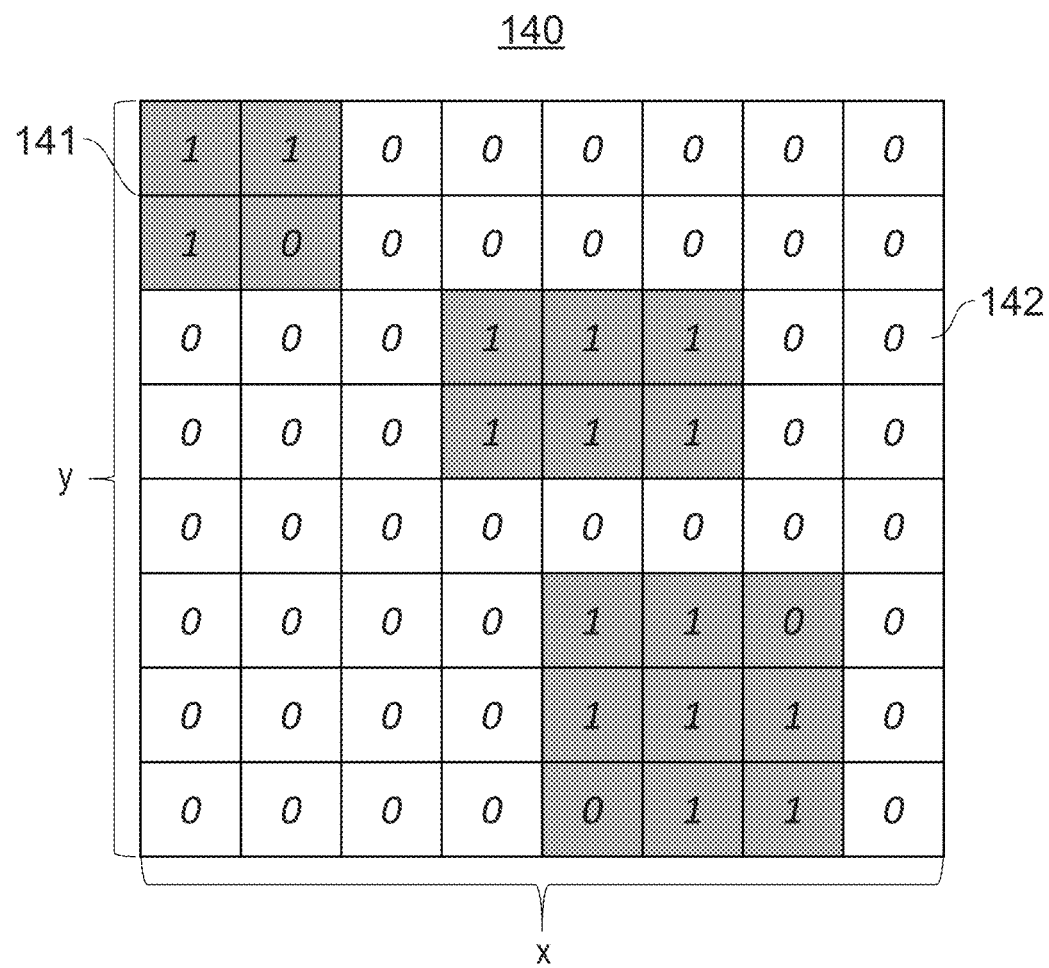
FIG. 1C is a diagram illustrating bounding boxes in a change grid.
Figure 1D:
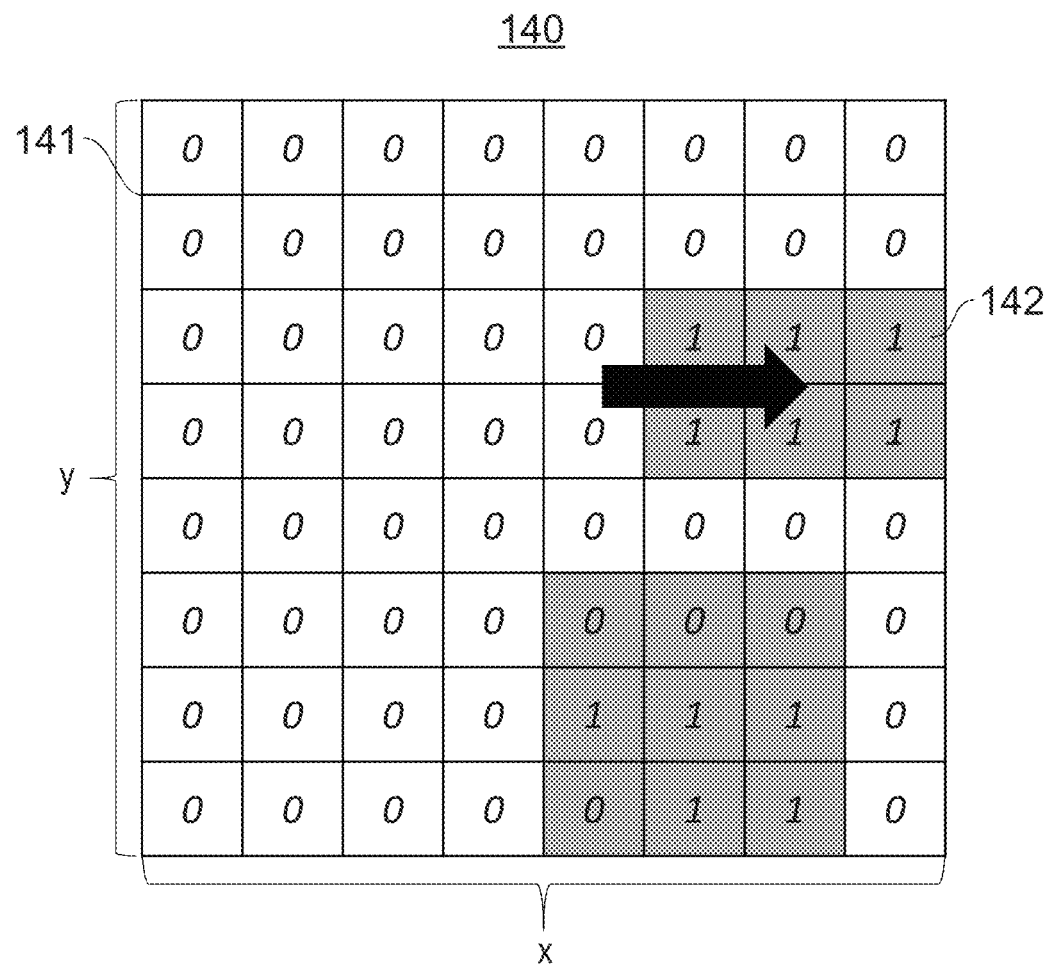
FIG. 1D is a diagram illustrating movement between change grids.

In order to generate the direction grid 130 the following steps are performed. Two consecutive change grids 120 are obtained from the video sequence. A first change grid 120 is illustrated in FIG. 1B. As explained above, the elements of the grid have a value of 1 if there is a change between the two corresponding elements of image 1 and image 2 and zero otherwise. For each change grid, segment identification is performed in which neighbouring elements in which a change has been detected (having a value of 1) are identified as a single segment. This is illustrated in FIG. 1B by the shading, with neighbouring elements being shaded in to form segments.

a. Next, a rectangular bounding box is formed around each segment detected. This process is illustrated in FIG. 1C in which segments are shaded to form bounding boxes. If two bounding boxes overlap, they are grouped together in one larger bounding box. This is performed separately for each of the two consecutive change grids 120.

b. Next, similar bounding boxes in the two consecutive change grids are identified by searching for a bounding box of similar of size. The comparison to determine the size similarity is performed based on a threshold of change in segment size, say 10%. If more than one candidate segment is identified in the preceding change grid, the closest segment (based on centre of the segment) is selected. If a segment in the preceding change grid does not have a segment that is similar enough in size to the segment in the later change grid, then no corresponding segment is identified. In a case where a two similar/corresponding segments are identified, a motion vector is calculated that is the vector between the centre of the two bounding boxes. This vector is assigned in the direction grid 130 to each element that is an element of the corresponding bounding boxes in the two change grids.

c. This process is illustrated by reference to the change grids shown in FIGS. 1C and 1D. FIG. 1D shows the later change grid and FIG. 1C shows the earlier change grid. There are two segments in FIG. 1D. Identifying a corresponding segment for the larger, 3 by 3 segment is performed by looking for a segment that is of similar size and location in the change grid shown in FIG. 1C. In this case, this is easy because there is a corresponding segment of the same size and location in FIG. 1C. As the segment has not moved a zero vector is assigned to the direction grid for elements corresponding to this 3 by 3 segment. This might correspond to a portion of the video sequence in which there is localized motion that doesn't have any particular direction across the video frame. The other segment in FIG. 1D is 3 by 2 in size. There is a segment having the same size in FIG. 1C which is quite nearby. However, this segment has moved. In this case a motion vector corresponding to the movement between the centres of the two bounding boxes is assigned to elements of the direction grid 130 corresponding to the 2 by 3 segments in both FIGS. 1C and 1D When generating the change grid 120 and the direction grid 130, the whole frame of the captured images 100, 110 may be taken into account, or only a part of the frame of the images 100, 110 and the grids thereof may be considered based on for example an area of interest in the image.

The size of the change grid 120 and the direction grid 130 corresponds to the size of the grid of the captured images 100, 110, or alternatively, to the size of the selected region in the captured images. The change grid 120 and the direction grid 130 shown in FIG. 1A consist of a plurality of rectangle-formed elements, however also another form, such as a square form, may be used.

In the present embodiment, the entries in the direction grid 130 correspond to the actual motion vector between the corresponding segments. Optionally, this motion vector could be normalized to obtain a unit vector that describes the direction of the average motion for each of the segments. Accordingly, the directional grid 120 could be populated with unit vectors that are associated with movement that has been determined for each of the elements 131. However, if the resolved motion vector is not normalised, this allows the speed of the object to be determined, as well as its direction of motion.

Figure 2A:
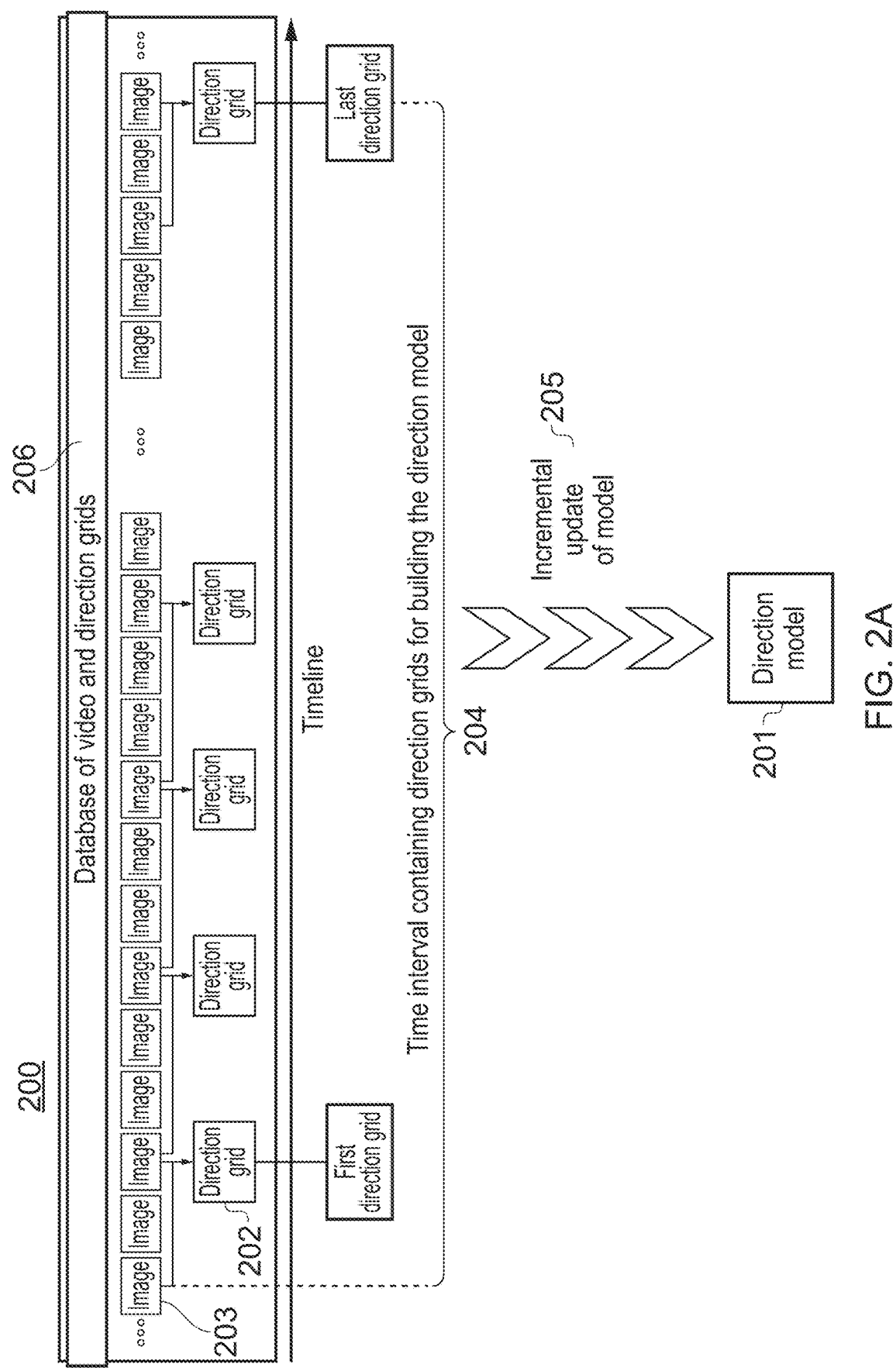
FIG. 2A is a diagram illustrating a method of generating a direction model.

FIG. 2A is an illustration of a method 200 for generating a direction model 201. A series of direction grids 202 is obtained based on captured images 203 as described above. For example, a first captured image 100 from a video sequence is compared to a second captured image 110 from the same video sequence to generate a first change grid. The second captured image is compared to the third captured image to generate a second change grid. The first and second change grids can then be used to generate the direction grid by the method described with reference to FIGS. 1B to 1D. However, the sampling frequency of the video sequence is not limited. The first and the last sampled image define a time interval 204 from which the series of direction grids 202 is obtained. Hence, the series of direction grids 202 comprises a number of direction grids which are used to build the direction model 201.

The time interval 204 may be selected so that it covers a selected scene in the video, which is of special interest. It can be for example a certain time of day, such as from 4 pm until 6 pm, or generally daytime, or night time. The direction model 201 may represent direction behaviour during such a time interval and may be used for example to model traffic situations during a rush hour. Deviations from this model would then represent abnormal (unexpected) motion during the rush hour. The time interval can also be related to a day of the week in order to have a model of normal direction behaviour on a specific day. It can be also a combination of the above, such as Friday, from 4 pm until 6 pm. Selecting a time frame aims at creating a model that represents normal motion expected in the monitored area of interest during the selected time.

The direction model 201 contains a grid with the same dimensions as the direction grids 202. Each element of the direction model 201 contains a vector and a count value. The non-zero vectors in corresponding elements of the direction grids 202 are used to create the element of the direction model 201. The non-zero vectors are incrementally accumulated and each time a non-zero vector is added to an element of the direction model 201, the count value of that element is increased by 1 so that the count value corresponds to the number of non-zero vectors used to form the overall vector in that element of the direction model 201. It means that a vector will be stored in each element of the direction model 201, wherein the vector of the direction model 201 accumulates the vector of directional movement of the corresponding elements of the series of direction grids 202 that are used to generate the direction model. The vectors of the direction model 201 are generated by adding together the vectors in corresponding elements of the direction grids used form the model. This process of vector addition is a well-known mathematical operation that is not described in detail here. The direction model 201 is stored in a memory or a database.

The direction model 201 may be updated over time by adding further direction grids from the video sequence to the series of direction grids 202. The direction model 201 may also be updated by removing direction grids from the series of direction grids 202. Before the direction model 201 is calculated, the value of the both the vector elements and the count values is set to zero, so that the count value begins from zero, and the accumulated vector begins with a zero vector. Accordingly, the accumulated vector and the counter correspond to the sequence of direction grids 202 that is used to create the direction model 201.

The series of direction grids 202 may be obtained from a live video sequence. It may also be obtained from direction grid data which has been generated in advance and stored for example in a database 206. Processing of the direction grid data is light weight because it does not require processing of raw video data. There is also no need to process the data on-site where it has been recorded but it can be transferred to a management site server where the processing takes place.

Figure 2B:
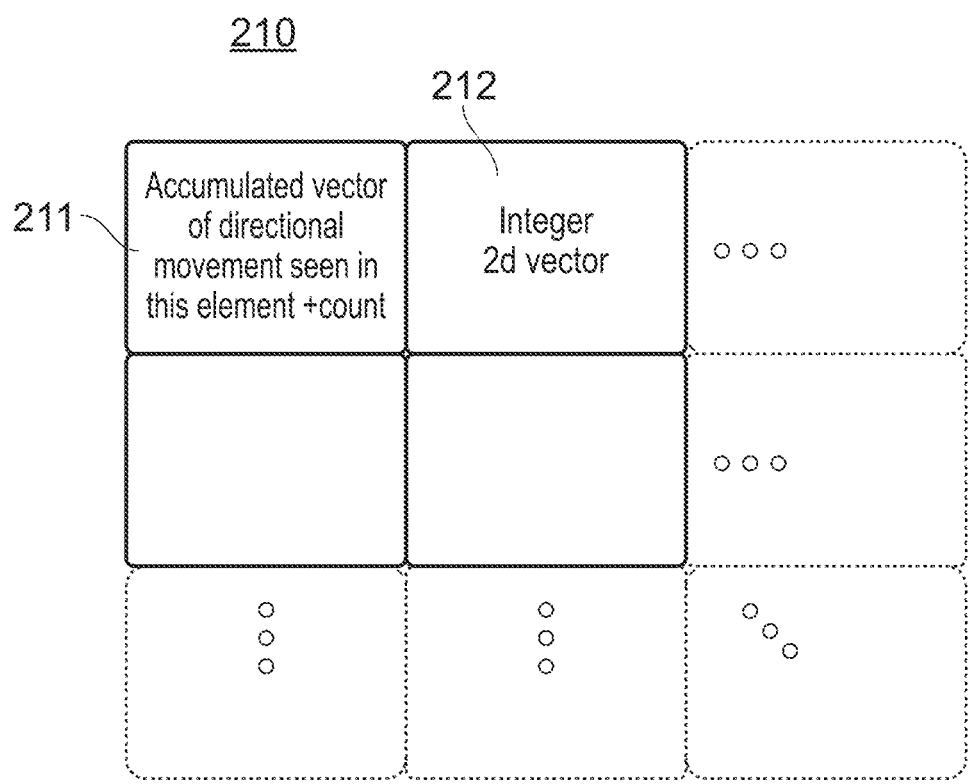
FIG. 2B is a diagram illustrating a direction model.

FIG. 2B shows a direction model 210. The direction model 210 has a grid format corresponding to the direction grid of FIG. 1A. The size of the direction model 210 is the same as the size of each of the direction grids 140 from which the direction model 210 is generated. As described above, each element of the direction model 210 contains a vector, e.g. 'a'-'d' or null vector '0'. Furthermore, each element of the direction model 210 contains an integer that serves as the count value.

Each element of the direction model 201 is determined by adding together all of the vectors that are assigned to the corresponding elements of the series of direction grids 202. Furthermore, the counter is incremented to identify the number of non-zero vectors that populate the series of direction grids 202. Accordingly, each element of direction model contains a resolved vector that identifies the aggregate motion that was detected over the series of direction grids 202, together with a count value that indicates the number of non-zero vectors that contribute to this aggregate vector. Thus, the value of the count value identifies the number of non-zero vectors of the direction grids 202 that contributed to the resultant vector of the direction model 201. Accordingly, the count value serves to identify the number of frames for which motion is detected, which is useful for determining the speed and direction of motion that has been detected.

Based on the model it is possible to see in which elements there has been a pattern in the direction of motion in the past in a certain scene of the video. Thus, the direction model 210 represents expected direction behaviour in the scene.

Figure 3:
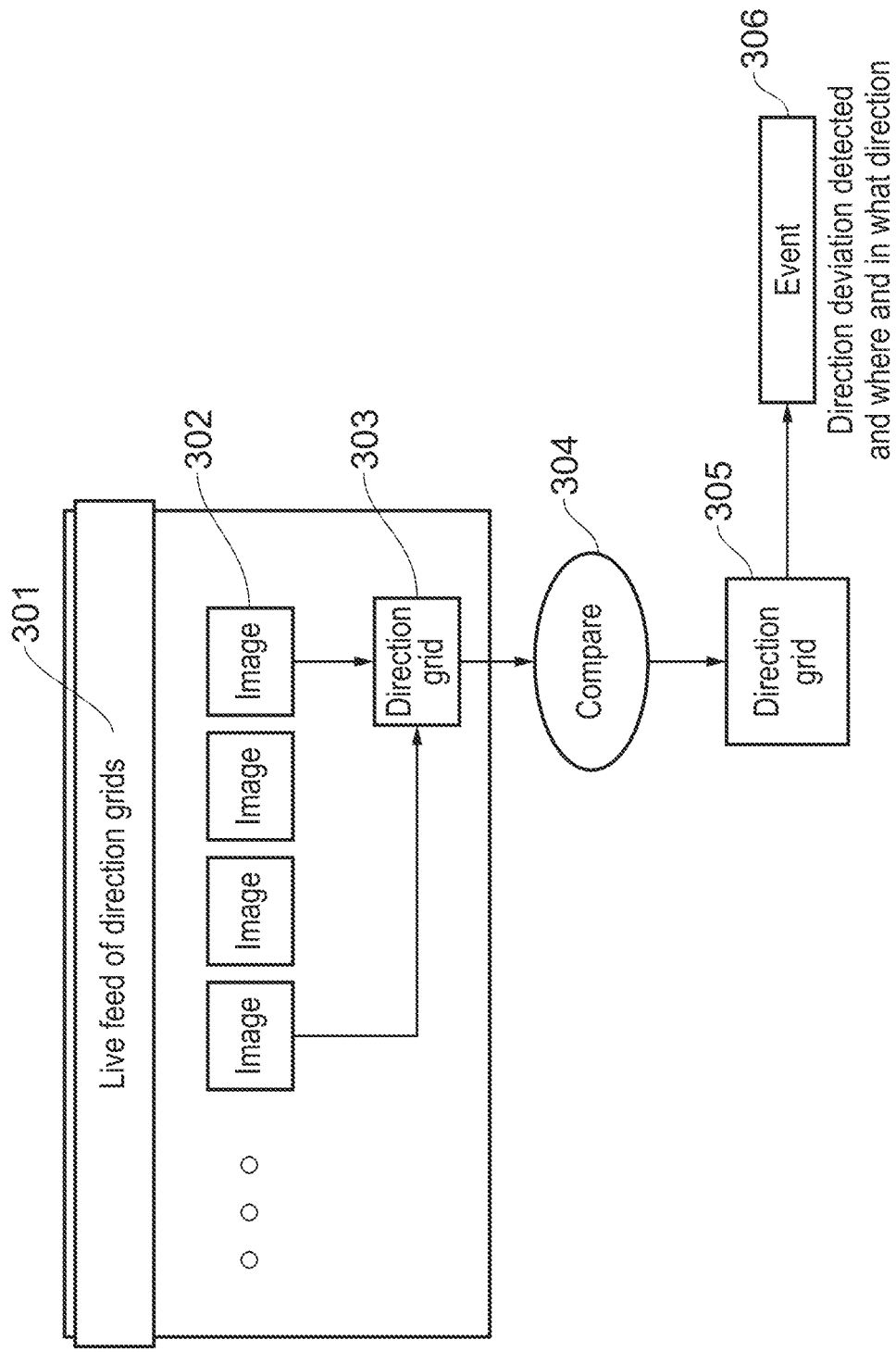
FIG. 3 is a diagram illustrating a method of detecting direction deviation in a scene of a surveillance video and triggering an event if deviation is detected.

FIG. 3 illustrates a method for detecting direction deviation in a scene of a surveillance video. First, a current direction motion grid 303 is generated from a live video feed 301 comprising a sequence of images 302. The video may also be a pre-recorded video instead of a live video. The temporal location of the current direction grid 303 on the time line is later than the time interval of the direction model 305. The direction model 305 is generated using the method described earlier. The current direction grid 303 obtained from the live feed 301 and the direction model 305 relate to the same scene of the video, for example, to the same target, e.g. a room that is being monitored at a specific time of the day, or a part of a highway where traffic situation is observed.

Next, the current direction grid 303 obtained from a specific scene in the video is compared to the direction model 305 which is generated based on history data of the specific scene in the video. The comparison 304 may include comparing elements in a region of the current direction grid 303 to corresponding elements in the corresponding region of the direction model 305. This comparison is performed by first normalizing the vector in the element of the direction model by dividing the vector by the count value and then comparing the normalized vector of the model with the vector in the direction grid 303. The comparison may be done by taking a dot product of the two vectors and if the value exceeds a predetermined threshold it is determined that the vectors are not similar.

The region may comprise any number of grid elements. A deviation may be found if one element deviates from the corresponding element of the model or if a predetermined number of elements deviate from the model. If, based on the comparison, the elements in a selected region of the current direction grid 303 differ from the corresponding elements in the corresponding region of the direction model 305, it may be determined that there is direction deviation.

It is noted that it is not necessary to use the complete area of the past direction grids to build the direction model 305, but it is also possible to extract a region of the direction grids and use that instead. Similarly, it is not necessary to use the whole area of the frames of the images 302, but only a specific region of the images can be selected. The direction model 305 and the current direction grid 303 can be compared with each other as long as they cover the same area of the video images and have the same dimensions. Of course, use of the whole frame or complete direction grids is also possible.

As a result of determining that there is direction deviation, an event 306 may be triggered. A confidence in the model is computed by dividing the length of the accumulated motion vector by the count value. If all motion vectors of the motion grids used to form an element in the direction model were in the same direction in the direction grid the value of the normalized motion vector of the direction model (i.e. the vector divided by the count value) will tend to have a larger, non-zero, magnitude. On the other hand, if the motion vectors of the direction grids used to form an element of the direction model were in different directions corresponding to there being no clear trend in direction of movement through that element of the video sequence, the magnitude of the normalized motion vector will tend to be smaller. If the confidence value (normalized motion vector of the element of the direction model) is not above a certain threshold, then it is concluded that there was no uniform or significant directional movement in the training phase, and thus this grid element is not used for the detection of deviation of motion. Triggering the event 306 may take into account a predetermined threshold of the confidence value, so that the event is triggered only if the number of deviating elements in a region exceeds the threshold.

The triggering of the event 306 may comprise one of setting a flag, setting a bit value to 1, raising an alert and outputting a notification. The notification may be sent to a user to notify him that direction deviation is detected. The triggered event 306 may also comprise outputting information of the location and/or number of the deviating elements on the current direction grid 303. Hence the trigger can be used to inform the user, where the direction deviation has been detected. In addition, the moment at which the deviation occurs in the video may be output. The output information may include also other information about the deviation. The deviation information may be stored in a memory or database for later analysis.

FIG. 4 shows a flowchart of a method 400 for updating a motion model 403 according to what is considered as expected direction behaviour 404. In the method, live video feed 401 is matched 402 to the direction model 403. This includes comparison of a current direction grid to the direction model as described above. In a normal case, if the current direction grid obtained from the live video feed differs from the expected direction behaviour 404, it may trigger an event 406. Depending on the triggered event, it may cause for example sending an automatic notification to a user or outputting an alarm by the system.

In some cases, however, the direction model 403 may be updated to include also the direction grids in which deviation occurs in the expected direction behaviour. This way, such deviations will tend not to trigger an event in future. The decision of which deviations are included in the direction model 403 as expected behaviour 404 may be made by a human user for example after noticing that a false alarm has been triggered. The motion model can "learn" 405 from the made decisions and include similar deviations in future automatically in the pattern of expected direction behaviour.

Although the embodiments described direction deviation with respect to a generated direction model 403, in an alternative embodiment, the direction model could be created by some other feature. For example, if a direction of expected movement is known, e.g. cars down a one-way street, then a reference vector could be set manually in place of or taking the role of the direction model. In this case, a direction vector from the current direction grid is compared with the reference vector in order to determine motion deviation. It can be understood that the direction model, however generated, contains reference vectors against which motion deviation is determined.

Figure 5A:
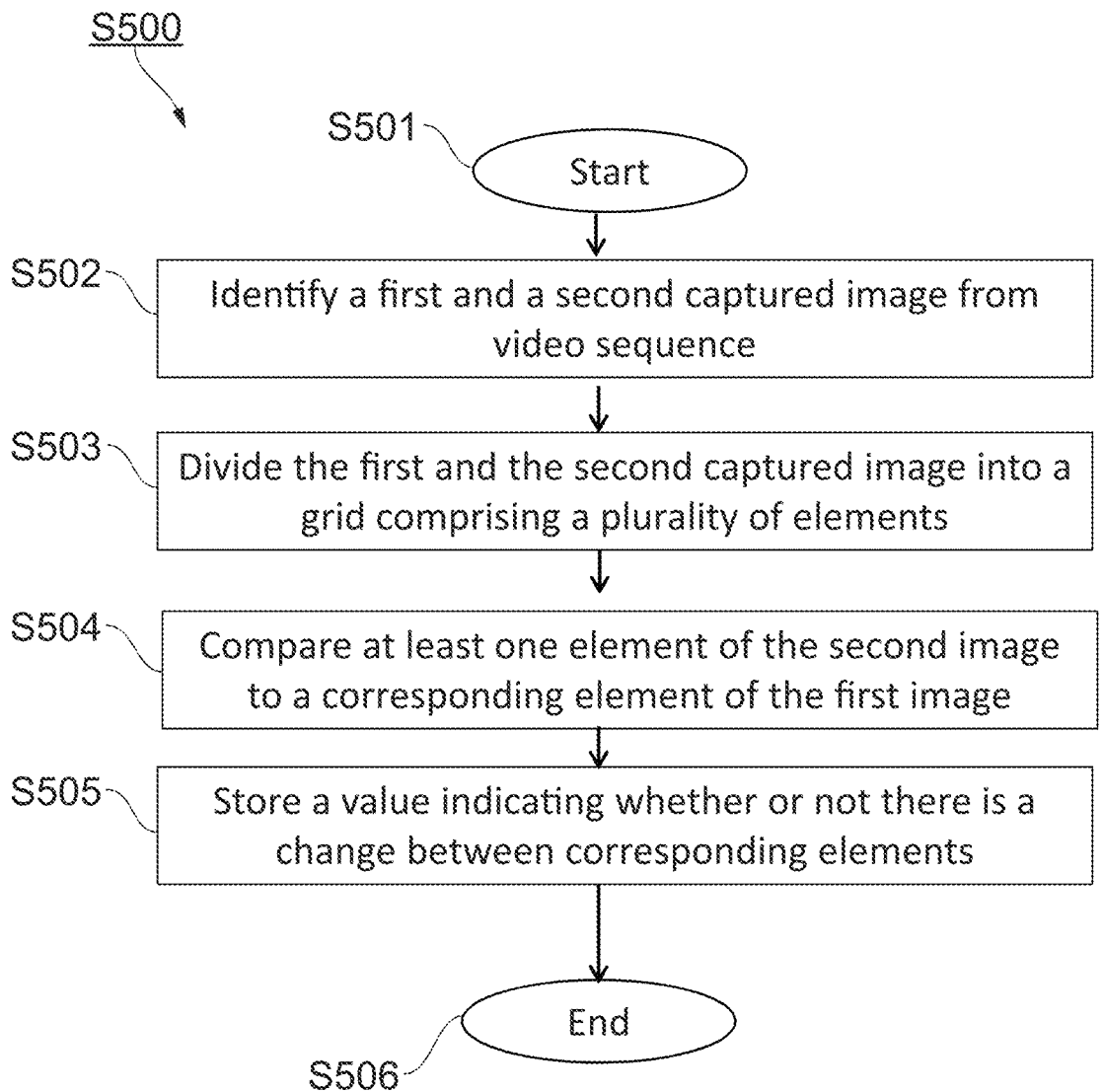
FIG. 5A is a flowchart illustrating a method for generating a change grid.

With reference to the flowchart in FIG. 5A, a method S500 for generating a change grid 120 is described. The method starts at step S501. First, at step S502, a first and a second captured image are identified from a video sequence. It is to be noted that the terms "first" and "second" are used for clarity purposes only. There is no limitation of any kind with respect to the temporal location of the two images in relation to other images in the video sequence.

At step S503, the first and the second captured image are divided into a grid comprising a plurality of elements. Then, at step S504, at least one element of the second image is compared to a corresponding element of the first image. At step S505, a value indicating whether or not there is a change between corresponding elements is stored in the element of the change grid 120. The method ends at step S506.

Figure 5B:
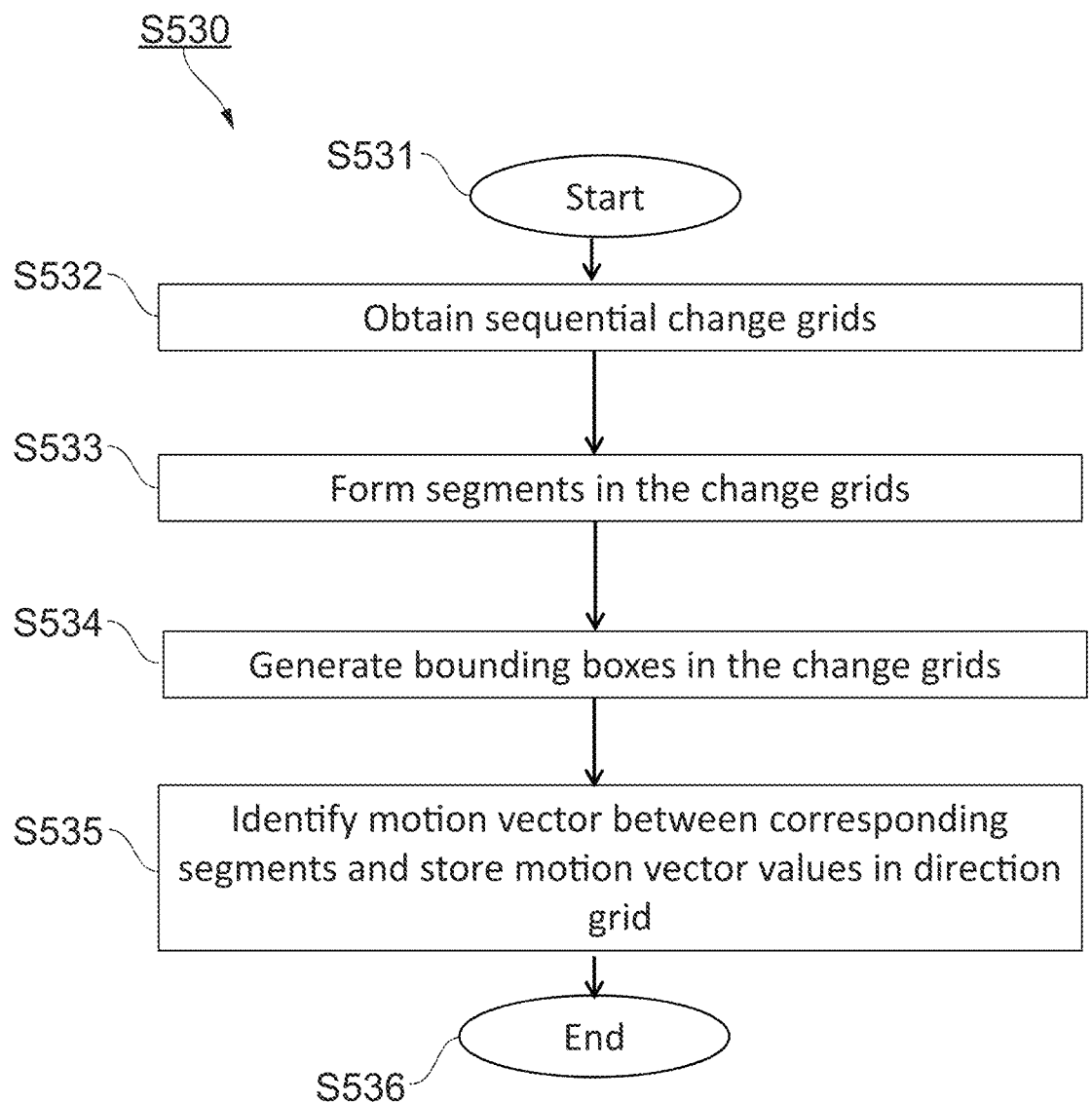
FIG. 5B is a flowchart illustrating a method for generating a direction grid.

FIG. 5B shows a method S530 of obtaining a direction grid 130 from change grids 120. In step S532 two sequential change grids are selected from the video sequence. In step S533, segments are identified in each of the change grids. Segments are formed of neighbouring elements that have a change recorded in the change grid. In step S534 bounding boxes are formed around the identified segments. Again this is done separately in each of the sequential change grids. In S535 the segments in the later change grid are compared with the identified change grids in the earlier change grid to identify segments that are of a similar size and position. Where corresponding segments can be identified, a motion vector corresponding to the movement between the centres of the two segments (from the earlier change grid to the later change grid) is identified and stored in the elements of the direction grid that correspond to both the earlier and later location of the segment.

Figure 5C:
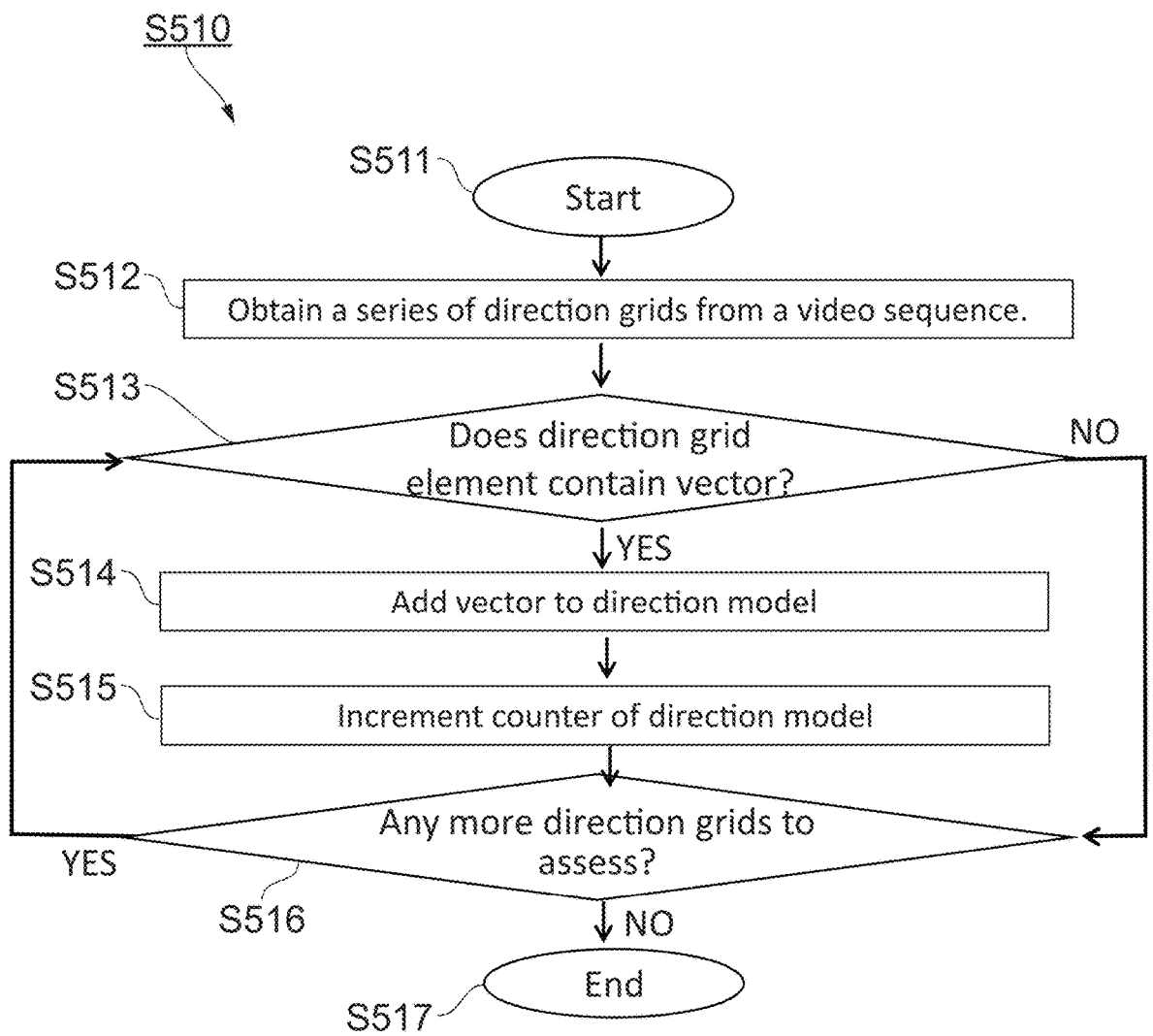
FIG. 5C is a flowchart illustrating a method for generating a direction model.

Referring to the flowchart of FIG. 5C, a method S510 for generating a direction model is described. The method starts at step S511. First, a series of direction grids is obtained from a video sequence (S512) to be modelled. At step S513, for each element of the direction model, the corresponding element of each direction grid of the series of direction grids is assessed to determine whether it contains a vector. If a vector is detected in any of the corresponding elements of the series of direction grids (YES in S513), then this vector is added to the corresponding element of the direction model, so that the element of the direction model stores a resultant of the vectors of the direction grid (S514). Furthermore, a count value is incremented, to identify the number of vectors that contribute to the resultant vector of the direction model (S515). It is assessed whether there are any more direction grids in the sequence that are to be assessed (S516). If so, step S513 is performed again, until each of the elements of the direction model has been assessed for each of the direction grids. When each of the direction grids has been assessed for each of the elements, the method ends at step S517. As a result, the direction model includes elements which each contain a count value that identifies the number of non-zero vectors of the corresponding elements of the direction grids, together with a resultant vector that has been accumulated by adding together all of these non-zero vectors.

A variety of techniques are available to add the vectors together, and to count the number of vectors, with FIG. 5C providing an example. As an alternative, the vectors could be extracted from the elements of the direction grids, and then counted and added together in a separate step, rather than assessing in turn each direction grid from the series of direction grids.

Figure 5D:
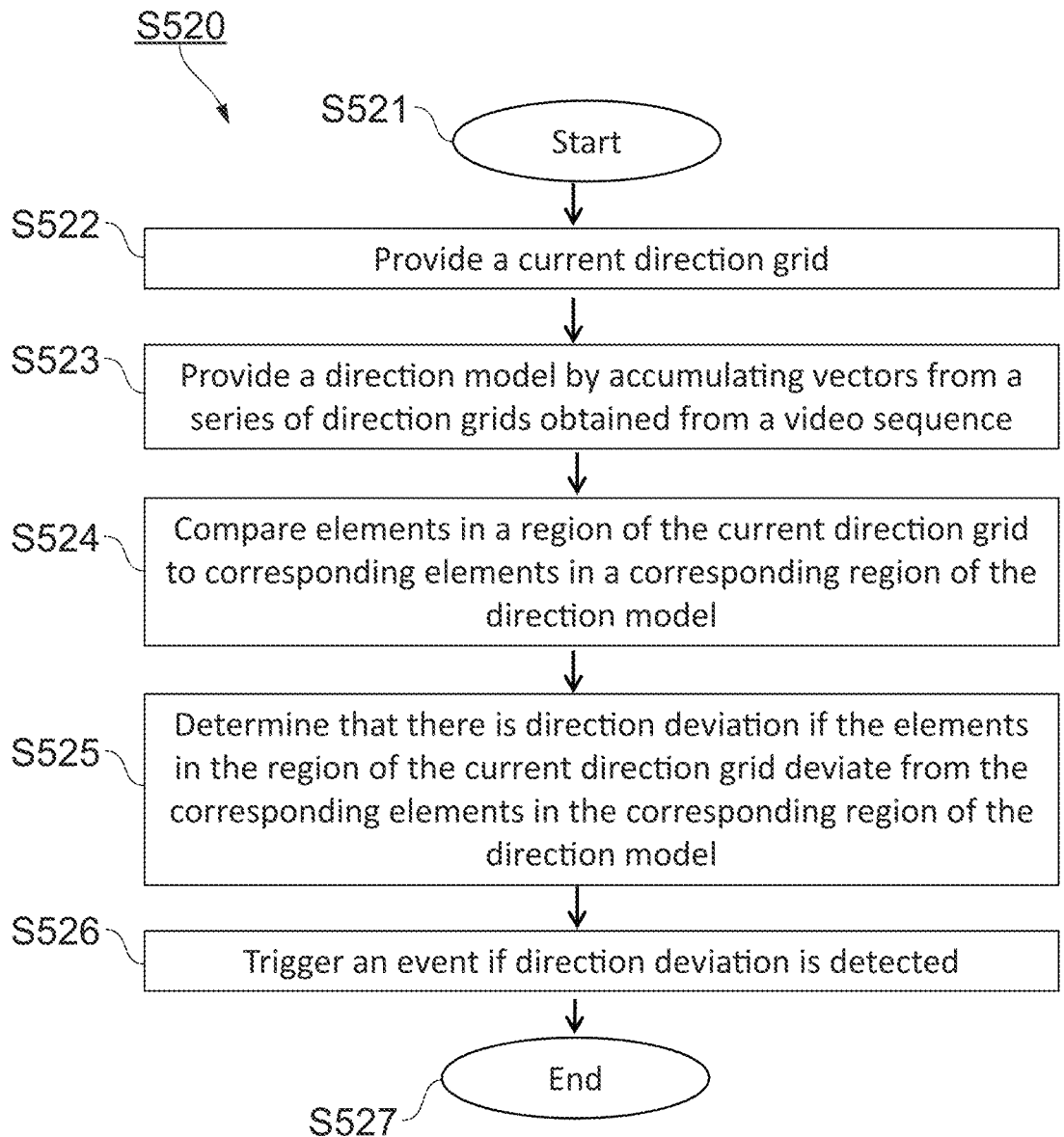
FIG. 5D is a flowchart illustrating a method for detecting direction deviation in a scene of a surveillance video.

FIG. 5D illustrates a method S520 for detecting direction deviation in scene of a surveillance video. The method starts at step S521. First, at step S522, a current direction grid is provided. The current direction grid can be generated by comparing two images to each other which are captured from a live video feed comprising a sequence of images, as described above with reference to FIG. 5A. Alternatively, the direction grid can be pre-stored in a memory, e.g. together with the video data. The current direction grid is formed as described with reference to FIGS. 5A and 5B.

Next, at step S523, a direction model is provided. The direction model is a grid-form presentation of expected direction behaviour based on history data obtained from a video sequence of the scene. The direction model has been generated by accumulating vectors from a series of direction grids obtained from the video sequence, as described above in connection with FIG. 5C.

At the next step S524, the current direction grid is compared to the direction model. The comparison may include comparing elements in a selected region of the current direction grid to corresponding elements in the region of the direction model. The comparison is performed by a dot product between the vector of the element of the current direction grid and the vector of the corresponding element of the direction model. If the dot product is greater than a threshold it is determined that there is direction deviation.

At S525, it is determined, based on the comparison, that there is direction deviation, if the elements in the region of the current direction grid deviate from the corresponding elements in the corresponding region of the direction model.

As a result of detecting a direction deviation, an event can be triggered (S526). Whether the event is triggered or not may depend on whether the deviation fulfils certain criteria, for example whether it exceeds a certain threshold. For instance, a certain level of noise can be taken into account to reduce unnecessary alerts. The method ends at step S527.

The above described processing may be implemented in various hardware depending on the situation. Various hardware that can detect direction deviation will now be described.

Figure 6:
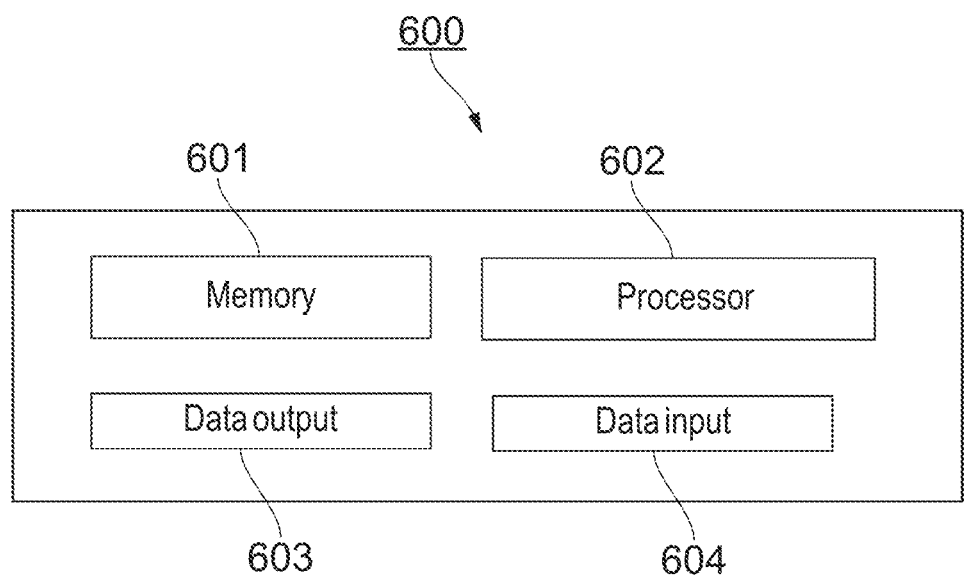
FIG. 6 is a simplified block diagram illustrating an apparatus.

FIG. 6 is a simplified block diagram illustrating a first apparatus 600. The apparatus 600 includes at least one processor 602 configured to process video sequences and direction grid data. The apparatus 600 includes at least one memory 601 configured to store video, direction grid and direction model data and computer program code for one or more programs (not shown).

The processor 602 is configured, with the computer program and memory 601, to generate a current direction grid. The processor 602 is further configured to generate a direction model from the video sequence by accumulating indications from a series of direction grids obtained from the video sequence, as previously described. The processor 602 is also configured to process pre-stored direction grids and direction models.

The processor 602 is further configured to perform a comparison between the current direction grid and the direction model and to determine, whether or not there is a change between corresponding elements of the current direction grid and the direction model, according to the previously described methods. The computer programs executed by the processor 602 and memory 601 may perform the previously described video sequence processing. Thus, the apparatus 600 is configured to detect direction deviation by executing the disclosed methods.

The apparatus 600 may further comprise a data input 604 configured to receive data, such as video data, and a data output 603 configured to output data, such as a notification that direction deviation is detected. The data input 604 and data output 603 are configured to receive and send data to communicate with external devices. The apparatus 600 may also comprise wireless receivers and transmitters of data and connectors configured to connect the apparatus to a network such as WLAN, LTE or 5G network. Moreover, it may include an external memory unit, a sensor for detecting light and/or motion, a database for storing information, and one or more drivers. The apparatus may be a video surveillance camera. Alternatively, the apparatus may be a client terminal, server or a personal computer.

Figure 7:
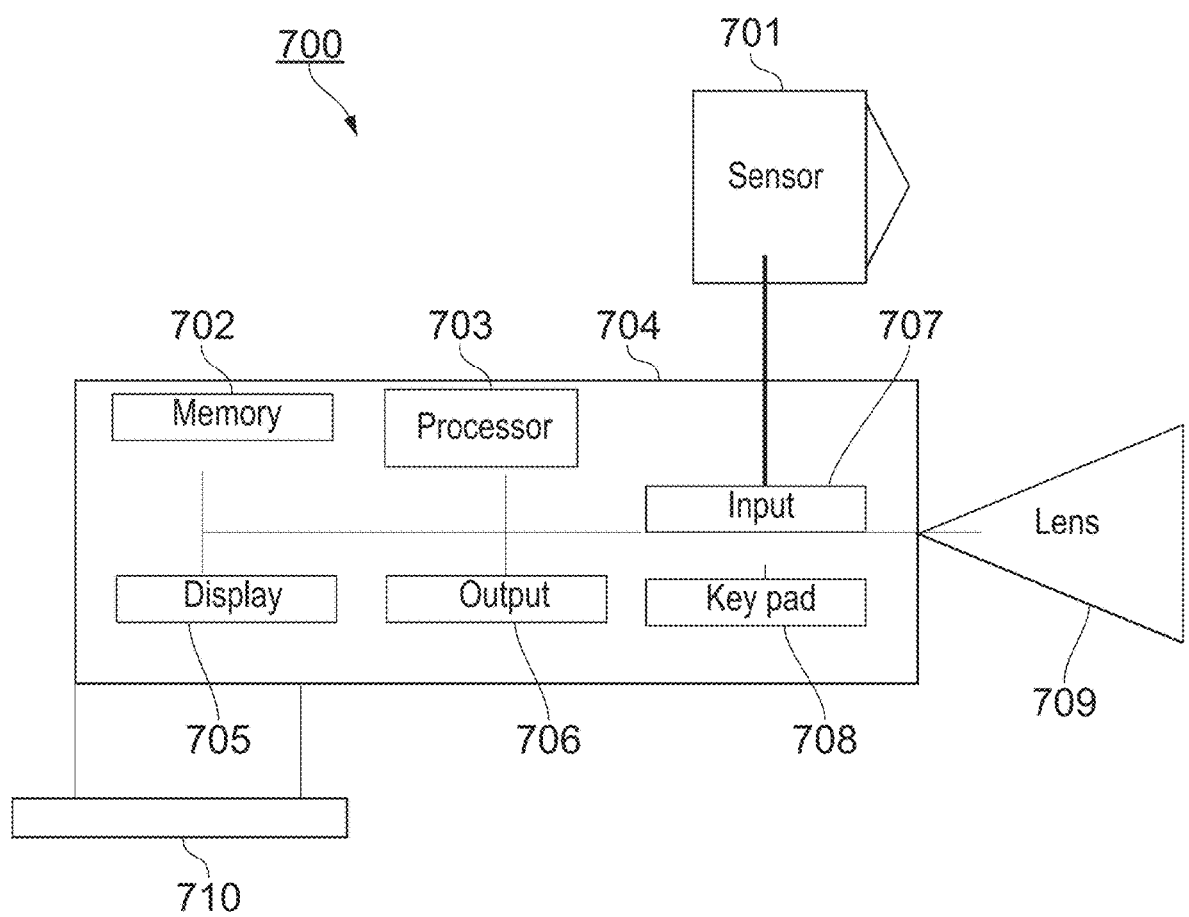
FIG. 7 is a simplified block diagram illustrating a video camera.

FIG. 7 is a simplified block diagram of a video surveillance camera 700.

According to some embodiments, the video surveillance camera 700 includes a lens 709 which is configured to capture a video and connected to at least one processor 703 and memory 702. The processor 703 is configured to process video sequences and direction grid data. The memory 702 is configured to store video, direction grid and direction model data and computer program code for one or more programs. The processor 703 is configured to process the video captured by the lens 709 and to generate a direction grid and a direction model based on the video sequence. The memory 702 is configured to store the recorded video sequence and generated direction grid data. The computer programs executed by the processor 703 and memory 702 may perform the previously described video sequence processing.

Additionally, the video camera 700 may comprise a housing 704, a data output 706 for outputting data such as a notification that direction deviation is detected, a data input 707 for receiving data such as video data, a key pad or a user interface 708. Optionally, the video camera 700 includes a sensor 701 for detecting light or movement and a display 705. It may further include a support element or fixing element 710 for installing the video camera to remain in a static position.

Figure 8:
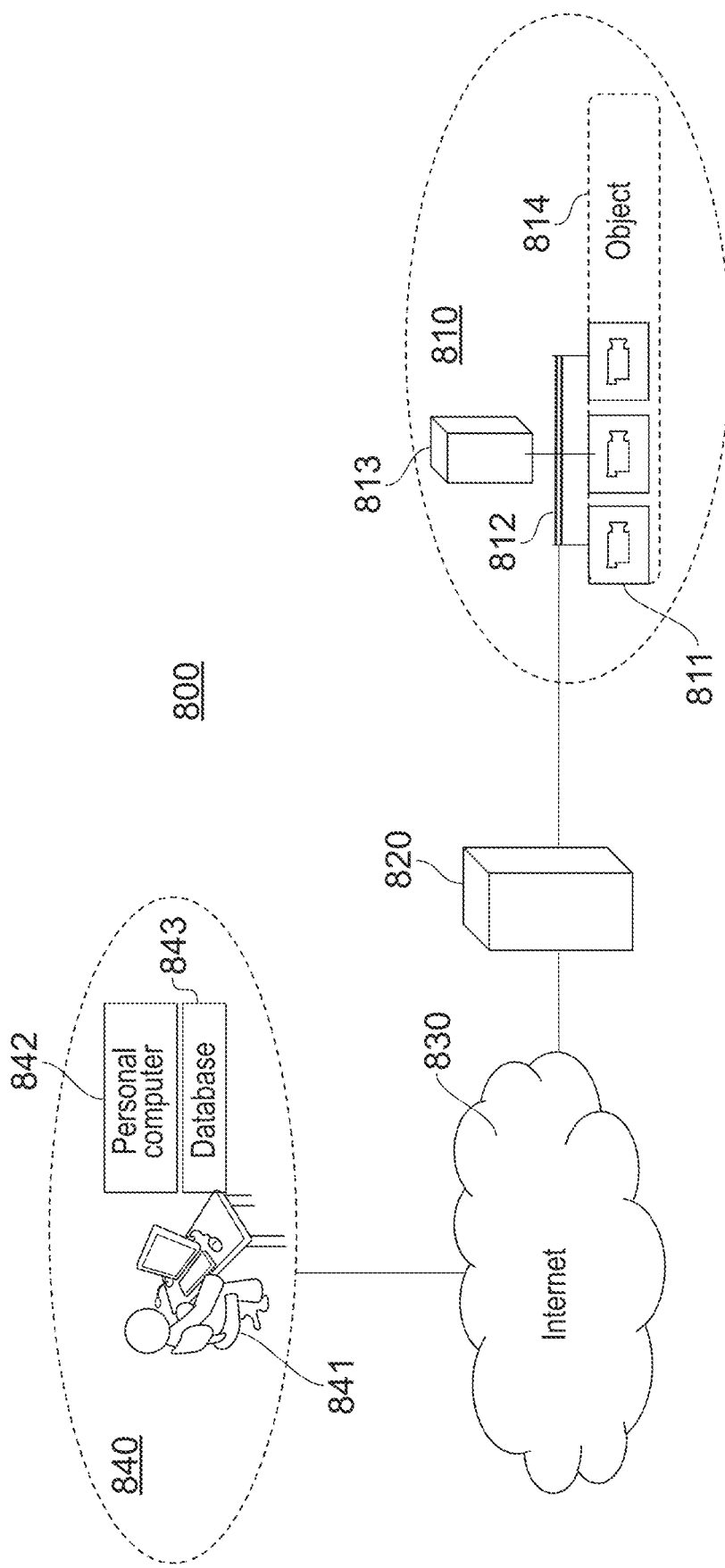
FIG. 8 is a simplified block diagram illustrating a system.

FIG. 8 is a simplified block diagram illustrating a system 800. The system 800 includes an apparatus connected logically to other entities in the system as described below. The apparatus may be implemented in various entities of the system.

The apparatus may be a video surveillance camera 811 installed at a remote site 810. The video surveillance camera 811 captures a video sequence of a scene, which is either processed by the video camera 811 or sent via a network or bus 812 to a server or computer 813, 820, 842 for processing. The video camera 811 may be connected to other video cameras via the bus 812 in order to provide full coverage of the monitored object 814. The video camera 811 may be additionally connected to one or more local computers 813 which comprise at least a processor and memory (not shown) for processing and storing video data.

The video surveillance camera 811 is used to record a video sequence for generating a direction grid and a direction model as previously described. The video surveillance camera may include all equipment, software and resources for analysing the video sequence and executing the disclosed methods. The remote site 810 may be for example an industry site, a living property, rural area or a shop. The remote site may be connected to a management site 840 via a network 830.

The apparatus may be implemented separately from the surveillance camera installation. For example, the apparatus may include or be integrated in a separate server 820, a cloud based server or a computer located at a management site 840.

The management site 840 may comprise personal computers 842 configured to operate the surveillance camera installation and a database 843 configured to store direction grid and video data. The personal computers 842 or servers at the management site may have greater processing capabilities and resources than what is available at the remote site 810. A person 841 using the personal computer 842 may receive a notification that direction deviation has been detected and may react to it accordingly. The user may for example determine that the direction deviation belongs to normal direction behaviour and decide to include the deviation in the direction model.

According to an embodiment, direction grid data may be sent to the network 830 to be processed externally of the surveillance camera installation. The data may be processed for example at the management site 840 including one or more personal computers configured to operate the surveillance camera installation.

Figure 9A:
FIG. 9A is a graphical representation of an image captured from a surveillance video sequence.

FIG. 9A is a graphical representation of a captured image showing a part of a highway where traffic is observed. The image may be obtained from a video sequence recorded by a video surveillance camera.

Figure 9B:
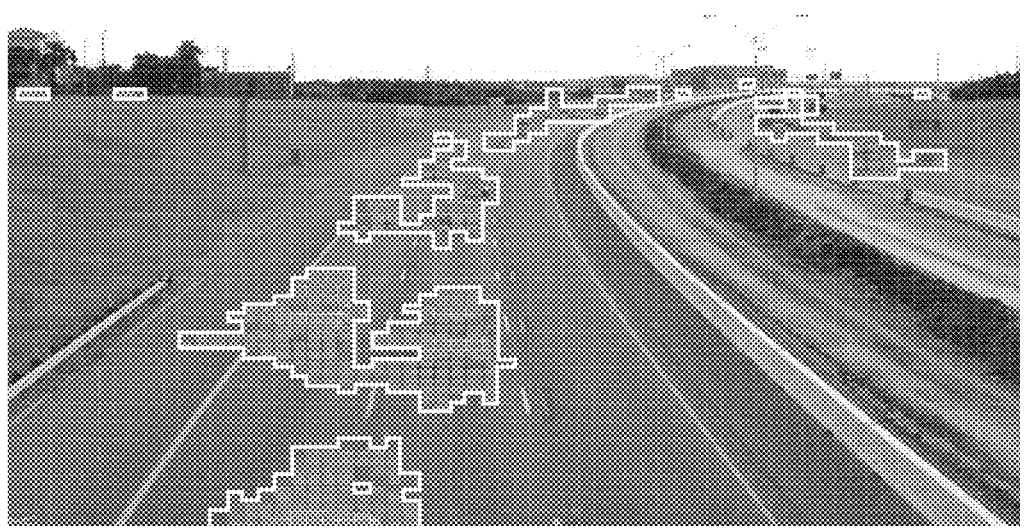
FIG. 9B is a graphical representation of the direction grid as an overlay on the captured image.

FIG. 9B is a graphical representation of a direction grid as an overlay on the captured image of FIG. 9A. The image has been divided into a grid of elements. The elements in which a motion has been detected between two change grids of the video sequence are shown as highlighted on the direction grid.

Figure 9C:
FIG. 9C is a graphical representation of a pattern showing accumulated direction grid data.

FIG. 9C is a graphical representation of a pattern showing accumulated direction data, corresponding to the direction model. All elements of the direction model in which motion has occurred in the past are assigned a colour determined by the direction. The highlighted area represents also the area in which motion is expected. If a change to the direction of motion is detected, that would be interpreted as abnormal or unexpected motion which may cause triggering an alarm.

FIG. 9C shows a video feed of vehicles driving on both sides of a road, the video feed being superimposed by the direction model. To left of FIG. 9C is shown a first segment, which indicates that vehicles are observed moving away from the camera. To the right of FIG. 9C is shown a second segment, which indicates that vehicles are observed moving towards the camera. The direction of the detected vehicles is compared with the direction model, and since all of the vehicles are travelling in the expected direction, it is not necessary to raise an alarm. An alarm would be raised if a vehicle is detected that is not moving in the expected direction. This could indicate a vehicle being driven on the wrong side of the road, or a collision between vehicles. In addition, an alarm may be raised if it is detected that the vehicles have stopped moving.

FIG. 9C shows that on each side of the road, the vehicles are observed moving in three of the available lanes, with an emergency lane in which no motion is expected to occur. Accordingly, the direction model is populated by a null vector, indicating that no motion is expected. If a vehicle does occupy the emergency lane, then an alarm will be raised. As a consequence, it can be identified that there is an emergency, or that a vehicle is being driven in the wrong lane.

Figure 9D:
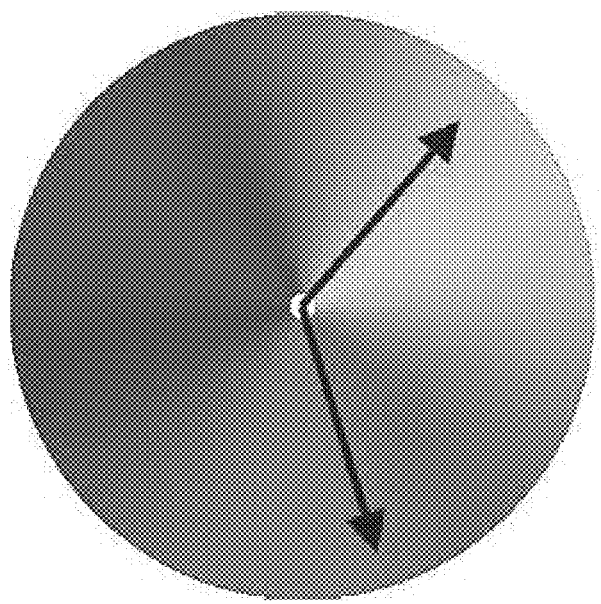
FIG. 9D is a key that is used to identify vectors that are shown in FIG. 9C.

FIG. 9D is a key that associates a vector with a colour. The arrows correspond to the directions that are indicated by FIG. 9C.

The present disclosure is directed to, but is not limited to, surveillance systems such as city surveillance, mobile surveillance systems, transportation installations, and from small or medium-sized installations to high-security installations. The use of the present disclosure is not limited to video surveillance but it can be used also for other imaging applications.

The above examples can be realised by a computer, a central processing unit (CPU) or a micro processing unit (MPU) of a system or apparatus that reads out and executes a program recorded on a memory device to perform the functions of the above-described embodiments. The above examples can also be realised by a method, the steps of which are performed by the computer of the system or apparatus by, for example, reading out and executing a program recorded on a memory device to perform the functions of the above-described embodiments. For this purpose, the program is provided to the computer for example via a network or from a recording medium of various types serving as the memory device (e.g., a computer-readable medium such as a non-transitory computer-readable medium).

The computer may comprise one or more of a central processing unit, micro processing unit, or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-Ray Disc (BD)™), a flash memory device, a memory card, and the like.

While the present invention has been described with reference to embodiments, it is to be understood that the invention is not limited to the disclosed embodiments. The present invention can be implemented in various forms without departing from the principal features of the present invention. The scope of the following claims is to be accorded the broadest interpretation so as to encompass all such modifications and equivalent structures and functions.

What is claimed is:

1. A method for detecting motion deviation in a video sequence, comprising:
generating a plurality of change grids, each change grid comprising a plurality of elements generated by storing in each element of the change grid an indication of whether there is a change between corresponding elements of at least two images obtained from a video sequence;
generating a current direction grid from a pair of change grids by searching for a movement of a corresponding segment identified in each change grid, the movement occurring between the locations of the segment in each of the pair of change grids and storing in elements of the current direction grid a vector corresponding to the movement of the segment;
comparing a vector in an element of the current direction grid to a vector in a corresponding element in a direction model, wherein the direction model is generated by accumulating vectors of corresponding elements of a series of direction grids from a training video sequence;
detecting motion deviation in the video sequence in accordance with the result of the comparison;
triggering an event if the motion deviation is detected; and
updating the direction model such that an event for a given motion deviation detected is not to be triggered, wherein the given motion deviation is identified based on a user instruction.

2. The method of detecting motion deviation in a video sequence according to claim 1, wherein the segment in each change grid consists of a plurality of elements in which a change has been indicated, wherein the plurality of elements are neighbouring one another.

3. The method of detecting motion deviation in a video sequence according to claim 1, together with counting the number of non-zero vectors accumulated in each element of the direction model.

4. The method according to claim 3, comprising triggering the event only when a confidence value exceeds a predetermined threshold, wherein the confidence value for an element of the direction model is determined by dividing the accumulated vector of the element by a count value of the element.

5. The method according to claim 3, wherein the comparing comprises comparing a plurality of elements of the current direction grid with corresponding elements of the direction model.

6. The method according to claim 3, wherein the images from the training sequence used for generating the direction model have an earlier temporal location in the video sequence than the images used for generating the current direction grid.

7. The method according to claim 3, wherein the direction model has the same dimensions as the current direction grid.

8. The method according to claim 3, wherein the plurality of direction grids is obtained from a certain time interval of the video sequence.

9. The method according to claim 8, wherein the time interval is defined by a time of the day and/or day of the week.

10. The method according to claim 1, further comprising outputting information about the location of the at least one deviating element on the current direction grid.

11. The method according to claim 1, further comprising incrementally updating the direction model by adding direction grids related to the scene to the series of direction grids.

12. The method according to claim 1, wherein the vector corresponding to movement of the segment is stored in elements of the current direction grid corresponding to the location of the segment in one or both of the earlier change grid of the pair of change grids and the later change grid of the pair of change grids.

13. The method according to claim 1, wherein before the direction model is calculated, the initial vector of the direction model in each element of the direction model is a null vector ('0').

14. The method according to claim 1, wherein the current direction grid is obtained from a live video sequence from a static video camera.

15. The method according to claim 1, wherein the triggering the event comprises at least one of setting a flag, setting a value of a bit to 1, raising an alarm, and outputting a notification.

16. The method according to claim 1, wherein the triggering of the event causes sending a notification to a user that direction deviation is detected.

17. The method according to claim 1, wherein the corresponding elements have the same location on each grid defined by a row and a column.

18. The method according to claim 1, wherein the video sequence comprises surveillance video sequence.

19. The method according to claim 1, further comprising, when generating a current direction grid, generating a bounding box around the segment in the each of the pair of change grids and determining the vector corresponding to movement of the segment based on the movement of corresponding bounding boxes in the pair of change grids.

20. The method according to claim 19, wherein the vector corresponding to movement of the bounding box is determined based on a change in the position of the centre of the corresponding bounding boxes between the pair of change grids.

21. The method according to claim 19, further comprising searching for corresponding bounding boxes between frames based on at least one of sizes of bounding boxes generated in the pair of change grids and the locations of the bounding boxes generated in the change grids.

22. An apparatus for detecting direction deviation in a video sequence, comprising:
at least one processor; and
at least one memory including computer program code configured to, when executed by the at least one processor, cause the apparatus to:
obtain two images of the video sequence;
generate a plurality of change grids, each change grid comprising a plurality of elements generated by storing in each element of the change grid an indication of whether there is a change between corresponding elements of at least two images from a video sequence;
generate a current direction grid from a pair of change grids by searching for a movement of a corresponding segment identified in each change grid, the movement occurring between the locations of the segment in each of the pair of change grids and storing in elements of the direction grid a vector corresponding to the movement of the segment;

compare a vector in an element of the current direction grid to a vector in a corresponding element in a direction model, wherein the direction model is generated by accumulating vectors of corresponding elements of a series of direction grids from a training video sequence;

detect motion deviation in the video sequence in accordance with the result of the comparison;

trigger an event if the motion deviation is detected; and update the direction model such that an event for a given motion deviation detected is not to be triggered, wherein the given motion deviation is identified based on a user instruction.

23. A non-transitory computer readable medium tangibly encoded with a computer program executable by a processor to perform actions comprising a method for detecting motion deviation in a video sequence, comprising:

generating a plurality of change grids, each change grid comprising a plurality of elements generated by storing in each element of the change grid an indication of whether there is a change between corresponding elements of at least two images obtained from a video sequence;

generating a current direction grid from a pair of change grids by searching for a movement of a corresponding segment identified in each change grid, the movement occurring between the locations of the segment in each of the pair of change grids and storing in elements of the current direction grid a vector corresponding to the movement of the segment;

comparing a vector in an element of the current direction grid to a vector in a corresponding element of a direction model, wherein the direction model is generated by accumulating vectors of corresponding elements of a series of direction grids from a training video sequence;

detecting motion deviation in the video sequence in accordance with the result of the comparison;

triggering an event if the motion deviation is detected; and updating the direction model such that an event for a given motion deviation detected is not to be triggered, wherein the given motion deviation is identified based on a user instruction.

\* \* \* \* \*